INVENTOR.
Thurston V. Williams
BY
Roberts, Cushman & Grover
ATT'YS

United States Patent Office 3,011,370
Patented Dec. 5, 1961

3,011,370
CUTTING TOOLS
Thurston V. Williams, Wilton, N.H., assignor to The O.K. Tool Company, Inc., Milford, N.H., a corporation of New Hampshire
Filed Mar. 2, 1959, Ser. No. 796,623
4 Claims. (Cl. 77—58)

While this invention is particularly applicable to boring tools it may also be applicable to other tools having replaceable bits, this application being a continuation-in-part of my application Serial No. 626,511 filed December 5, 1956, now abandoned.

Objects of the invention are to provide a cutting tool which is simple and economical to produce, which can be adjusted from the side of the tool through which the cutting end of the bit projects without access to the back of the tool, which is durable and reliable in use, which can be quickly and easily indexed and adjusted for depth of cut, and which is generally superior to tools of the type referred to.

According to the present invention the tool comprises a bit, a holder having a socket to receive the bit endwise, the bit and holder having telescoping surfaces, adjustable means to limit the depth to which the bit may be inserted into the socket, and means to lock the bit at the adjusted depth, the aforesaid surfaces being shaped to prevent relative rotation of the bit and holder while permitting free longitudinal adjustment, preferably by interfitting longitudinal serrations, whereby the bit may be indexed by adjusting its angular position relatively to the holder before it is inserted into the socket. The means to lock the bit at the adjusted depth preferably comprises an axial opening in the bit and a screw in this opening. Preferably the screw extends through the bit and threads into the holder and the holder has a stud fast to the bottom of the socket coaxial therewith and the inner end of the bit has an axial opening to telescope over the stud, with serrations on the telescoping surfaces of the stud and opening.

For the purpose of illustration a typical embodiment of the invention is shown in the accompanying drawings in which FIG. 1 is a side view of a tool showing the bit in end elevation;

Figure 1:
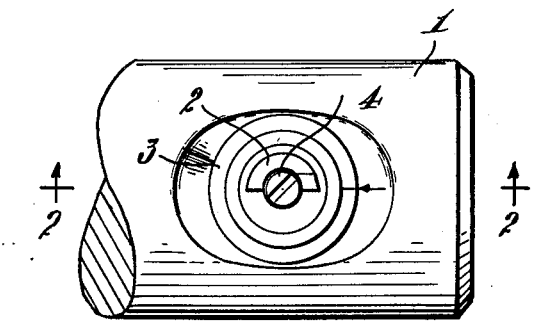
Figure 3:
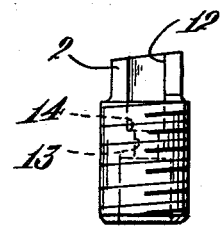
FIG. 3 is a side elevation of the bit.
Figure 2:
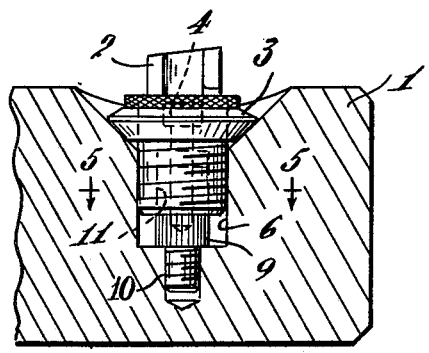
FIG. 2 is a section on line 2—2 of FIG. 1.
Figure 4:
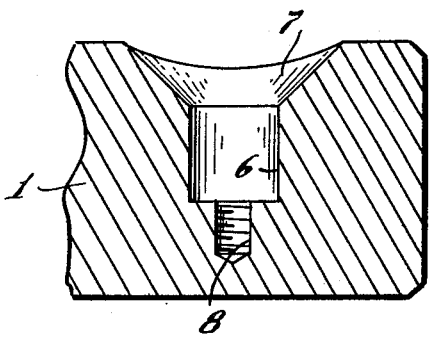
FIG. 4 is a section like FIG. 2 showing only the holder.
Figure 5:
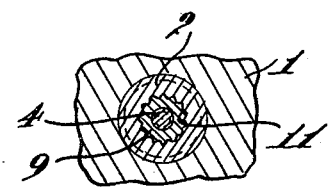
FIG. 5 is a section on line 5—5 of FIG. 2.

The particular embodiment of the invention chosen for the purpose of illustration comprises a cylindrical holder 1, a bit 2, an adjusting ring 3 and a screw 4. Extending radially into one side of the holder is a socket 6 having a flaring mouth 7 and an extension 8 of reduced diameter. Disposed in the socket 6 is a stud 9 having a lower end 10 of reduced diameter fast in the extension 8. While the stud may be fastened in any suitable way, as by brazing or a pressed bit, it is preferably threaded into the extension as shown. The upper end of the stud fits into an axial opening 11 in the bit 2 and the telescoping surfaces of the stud and bit are shaped to prevent relative rotation of the bit and holder while permitting free longitudinal adjustment. By serrating the interfitting surfaces as illustrated, the bit may be angularly indexed to any desired position.

The upper end of the bit 2 is provided with an axial opening 12 which communicates with the opening 11 through a bore 13 of reduced diameter to form a shoulder 14. The screw 4 extends through the bit from its outer cutting end with its head seating on shoulder 14 and its inner end threading into the stud 9.

To adjust the bit lengthwise the ring 3 is turned and to lock it in adjusted position the screw 4 is tightened. To index the bit to a different angular position the screw is unthreaded, the bit is withdrawn from the socket far enough to disengage the stud 9, the bit is then turned to the desired position and the screw 4 is again applied.

From the foregoing it will be evident that all manipulations of the tool are from the front, that is the cutting end of the tool without requiring any adjustment from the back, and the invention is applicable to tools having bit sockets which do not extend all the way through the bit holders.

It should be understood that the present disclosure is for the purpose of illustration only and that this invention includes all modifications and equivalents which fall within the scope of the appended claims.

I claim:

1. A cutting tool comprising a bit, a holder having a socket to receive the bit endwise, the socket having a bottom and an open end, a stud fast to said bottom coaxially with the socket and the inner end of the bit having an axial opening to telescope over the stud, the telescoping surfaces of the stud and opening being shaped to prevent relative rotation of the bit and holder while permitting free longitudinal adjustment, adjustable means to limit the depth to which the bit may be inserted into the socket, and means accessible from said end to lock the bit at the adjusted depth.

2. A cutting tool comprising a bit, a holder having a socket to receive the bit endwise, the socket having a bottom and an open end, a stud fast to said bottom coaxially with the socket and the inner end of the bit having an axial opening to telescope over the stud, the telescoping surface of the stud and opening being shaped to prevent relative rotation of the bit and holder while permitting free longitudinal adjustment, adjustable means to limit the depth to which the bit may be inserted into the socket, the bit having an axial bore extending therethrough and the stud having an axial bore in its outer end, and a screw extending through the axial bore of the bit from said end and threading into the axial bore of the stud to lock the bit at the adjusted depth.

3. A cutting tool comprising a bit, a holder having a socket to receive the bit endwise, the socket having a bottom and an open end, a stud fast to said bottom coaxially with the socket and the inner end of the bit having an axial opening to telescope over the stud, the telescoping surfaces of the stud and opening being provided with interfitting longitudinal serrations distributed around their peripheries which prevent relative rotation of the bit and holder while permitting free longitudinal adjustment, adjustable means to limit the depth to which the bit may be inserted into the socket, and means accessible from said end to lock the bit at the adjusted depth.

4. A cutting tool comprising a bit, a holder having a socket to receive the bit endwise, the socket having a bottom and an open end, a stud fast to said bottom coaxially with the socket and the inner end of the bit having an axial opening to telescope over the stud, the telescoping surfaces of the stud and opening being provided with interfitting longitudinal serrations distributed around their peripheries which prevent relative rotation of the bit and holder while permitting free longitudinal adjustment, adjustable means to limit the depth to which the bit may be inserted into the socket, the bit having an axial bore extending therethrough and the stud having an axial bore in its outer end, and a screw extending through the axial bore of the bit from said end and threading into the axial bore of the stud to lock the bit at the adjusted depth.

References Cited in the file of this patent
UNITED STATES PATENTS

| | | |
|---|---|---|
| 1,565,656 | Leggott | Dec. 15, 1925 |
| 2,120,621 | Nell | June 14, 1938 |
| 2,652,634 | De Vlieg | Sept. 22, 1953 |
| 2,913,935 | Flannery | Nov. 24, 1959 |